United States Patent
Ge et al.

(10) Patent No.: US 11,143,880 B2
(45) Date of Patent: Oct. 12, 2021

(54) TOF DEPTH SENSOR BASED ON LASER SPECKLE PROJECTION AND DISTANCE MEASURING METHOD THEREOF

(71) Applicant: XI'AN JIAOTONG UNIVERSITY, Xi'an (CN)

(72) Inventors: Chenyang Ge, Xi'an (CN); Xin Qiao, Xi'an (CN); Huimin Yao, Xi'an (CN); Yanhui Zhou, Xi'an (CN); Pengchao Deng, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 0 days.

(21) Appl. No.: 16/719,706

(22) Filed: Dec. 18, 2019

(65) Prior Publication Data
US 2020/0201064 A1 Jun. 25, 2020

(30) Foreign Application Priority Data

Dec. 19, 2018 (CN) .......................... 201811551867.0

(51) Int. Cl.
| | |
|---|---|
| G02B 27/48 | (2006.01) |
| G03B 21/00 | (2006.01) |
| H04N 5/74 | (2006.01) |
| G02B 27/42 | (2006.01) |
| G02B 27/00 | (2006.01) |

(52) U.S. Cl.
CPC ......... *G02B 27/48* (2013.01); *G02B 27/0075* (2013.01); *G02B 27/425* (2013.01); *G03B 21/005* (2013.01); *H04N 5/74* (2013.01)

(58) Field of Classification Search
None
See application file for complete search history.

(56) References Cited

FOREIGN PATENT DOCUMENTS

KR 20140028536 A * 3/2014

* cited by examiner

*Primary Examiner* — Michelle M Iacoletti
*Assistant Examiner* — Danell L Owens
(74) *Attorney, Agent, or Firm* — Dragon Sun Law Firm, PC; Jinggao Li, Esq.

(57) ABSTRACT

The present disclosure relates to a ToF depth sensor based on laser speckle projection. The ToF depth sensor includes a laser projector, which is used for projecting periodic infrared laser signals with phase information to the detected space; a diffraction optical element (DOE), which is used for uniformly distributing a beam of incident infrared laser signals into L beams of emergent infrared laser signals, enabling each beam of the emergent infrared laser signals to carry respective phase information, as well as the beam diameter, divergence angle and wavefront of the emergent infrared laser signals to be identical with those of the incident infrared laser signals, while only changing the transmission direction and controlling coded patterns projected out by laser speckles; and an image sensor, which is used for calculating depth information of a measured object by matching the laser speckles with pixel points of the image sensor.

9 Claims, 5 Drawing Sheets

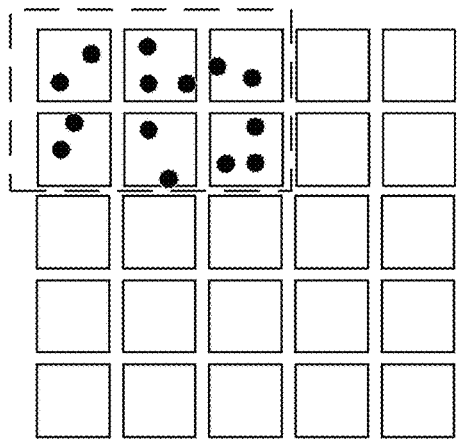

FIG. 8

| | |
|---|---|
| S100 | the laser projector projects periodic infrared laser signal with phase information to the detected space |
| S200 | the diffraction optical element (DOE) uniformly distributes the incident infrared laser signals into L beams of emergent infrared laser signals, and each of which forms a laser speckle after reaching the detected space and controls the coded pattern projected out by the laser speckle |
| S300 | first, the individual pixel size of the image sensor is obtained; next, each pixel of the image sensor and each beam of the emergent infrared laser signals forms laser speckles after reaching the detected space for transmitting and receiving view field matching; and then, the phase difference between the incident infrared laser signals and the emergent infrared laser signals is calculated to obtain the depth information. |

FIG. 9

TOF DEPTH SENSOR BASED ON LASER SPECKLE PROJECTION AND DISTANCE MEASURING METHOD THEREOF

CROSS-REFERENCE TO RELATED APPLICATIONS

This application claims priority to and the benefit of CN 201811551867.0, filed Dec. 19, 2018. The entire disclosure of the above-identified application is incorporated herein by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

FIELD

The present disclosure belongs to the technical fields of depth sensors, machine vision, laser speckles and ToF, in particular to a ToF depth sensor based on laser speckle projection and a distance measuring method thereof.

BACKGROUND

In recent years, three-dimensional depth sensing equipment has been unveiling. As a new medium for obtaining external information, a high-precision depth sensor is conducive to promoting the development of machine vision, realizing the robot's understanding of the external world, and driving the development of human-computer interaction. Depth sensing technology can be roughly divided into a passive form and an active form. Traditional binocular stereo vision distance measuring is a passive distance measuring method, which is greatly affected by ambient light and complex in stereo matching process. There are two main active distance measuring methods: structured light coding distance measuring and ToF (time of flight) distance measuring. Structured light coding distance measuring is essentially laser triangulation distance measuring, the distance measuring precision will decline sharply with the increase of the distance. A ToF camera obtains the depth information of corresponding pixels by calculating the ToF of an emitted laser. Although the resolution of depth images obtained by the ToF camera is relatively low at present, the response time is short, and the precision of the depth information obtained during long-distance distance measuring is relatively high. As a ToF module becomes smaller, it is gradually applied and popularized in embedded devices.

However, at present, all projection modules of ToF use floodlighting, the uniform illumination makes the energy of emergent light scattered, so a high-power laser is needed to realize long-distance distance measuring. However, in order to meet the requirements of safety standards and considering the power consumption and other aspects, the brightness of the light projected by the selected laser is often not high, so the phase information of the incident light received by an image sensor is prone to being interfered by background noise, thus affecting the accuracy and precision of distance measuring.

Therefore, a heretofore unaddressed need exists in the art to address the aforementioned deficiencies and inadequacies.

SUMMARY

In view of this, the present disclosure provides a ToF depth sensor based on laser speckle projection, including a laser speckle projection unit and an image sensor, wherein, the laser speckle projection unit is composed of a laser projector and a diffraction optical element (DOE);

the laser projector is used for projecting periodic infrared laser signals with phase information to the detected space;

the DOE is used for uniformly distributing a beam of incident infrared laser signals into L beams of emergent infrared laser signals, enabling each beam of the emergent infrared laser signals to carry respective phase information, as well as the beam diameter, divergence angle and wavefront of the emergent infrared laser signals to be identical with those of the incident infrared laser signals, while only changing the transmission direction and controlling coded patterns projected out by laser speckles, wherein L is a positive integer greater than 1; and the image sensor is used for obtaining depth information.

The present disclosure also provides a distance measuring method of the ToF depth sensor based on laser speckle projection according to claim 1, which includes the following steps:

S100: the laser projector projects the periodic infrared laser signals with the phase information to the detected space;

S200: the DOE uniformly distributes the incident infrared laser signals into the L beams of emergent infrared laser signals, each of which forms the laser speckle after reaching the detected space and controls the coded pattern projected out by the laser speckle;

S300: first, the individual pixel size of the image sensor is obtained; next, each pixel of the image sensor and each beam of the emergent infrared laser signals form laser speckles after reaching the detected space for transmitting and receiving view field matching; and then, the phase difference between the incident infrared laser signals and the emergent infrared laser signals is calculated to obtain the depth information.

Through the above technical solutions, on the basis of an existing ToF depth sensor, the DOE is used to replace the existing floodlighting realized by a diffuser through splitting the incident laser and projecting the laser speckles, and each beam of light reflected by the target has its own phase information, so the depth information of the measured object can be calculated with the obtained phase difference of the incident light and the emergent light by matching the laser speckles with the pixel points of the image sensor, thus reducing the power consumption of a laser speckle projection module and improving the anti-interference ability during distance measuring.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

FIG. 8 is a schematic matching diagram of a random laser speckle array and pixel points of an image sensor in one embodiment of the present disclosure; and FIG. 9 is a flow chart of a distance measuring method of a ToF depth sensor based on laser speckle projection in one embodiment of the present disclosure.

DETAILED DESCRIPTION OF THE EMBODIMENTS

Figure 1:
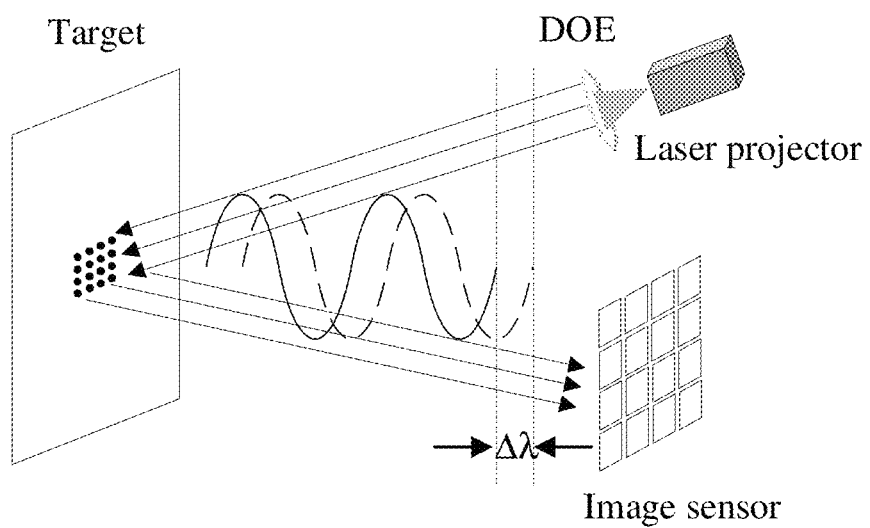
FIG. 1 is a structural diagram of a ToF depth sensor based on laser speckle projection in one embodiment of the present disclosure.

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

The present disclosure will be further described in detail below in combination with FIGS. 1 to 9.

In one embodiment, referring to FIG. 1, a ToF depth sensor based on laser speckle projection is disclosed, which includes a laser speckle projection unit and an image sensor, wherein, the laser speckle projection unit is composed of a laser projector and a diffraction optical element (DOE);

the laser projector is used for projecting periodic infrared laser signals with phase information to the detected space;

the DOE is used for uniformly distributing a beam of incident infrared laser signals into L beams of emergent infrared laser signals, enabling each beam of the emergent infrared laser signals to carry respective phase information, as well as the beam diameters, divergence angles and wavefronts of the emergent infrared laser signals to be identical with those of the incident infrared laser signals, while only changing the transmission direction and controlling coded patterns projected out by laser speckles, wherein L is a positive integer greater than 1; and the image sensor is used for obtaining depth information.

Figure 2:
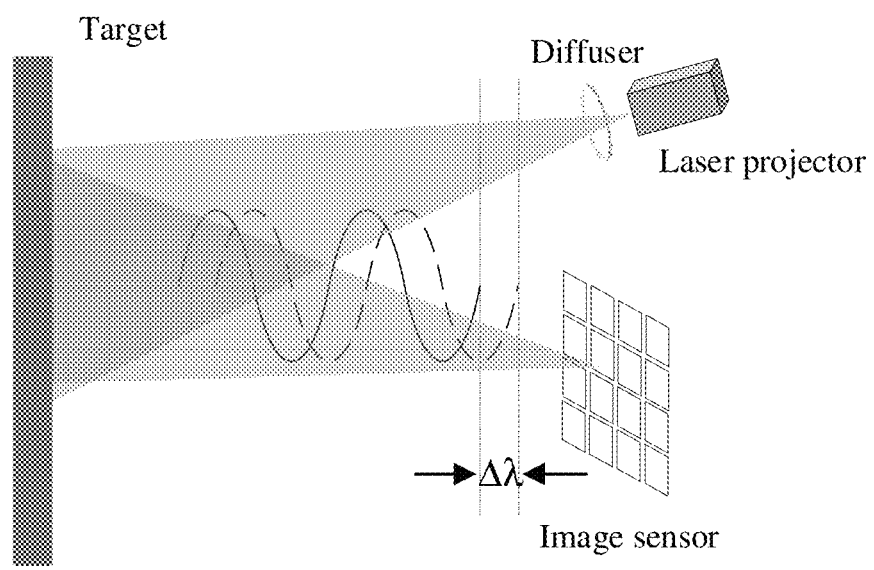
FIG. 2 is a structural diagram of an existing ToF distance measuring device in one embodiment of the present disclosure.
Figure 3:
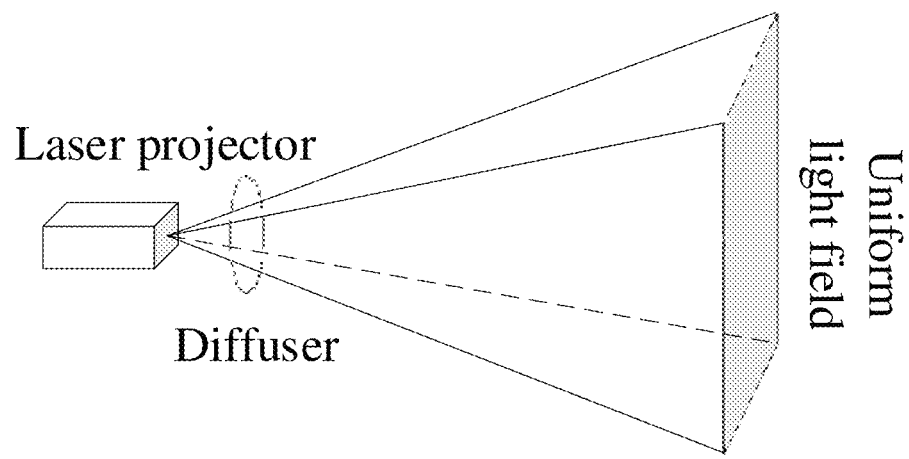
FIG. 3 is a schematic diagram of floodlighting in one embodiment of the present disclosure.
Figure 4A:
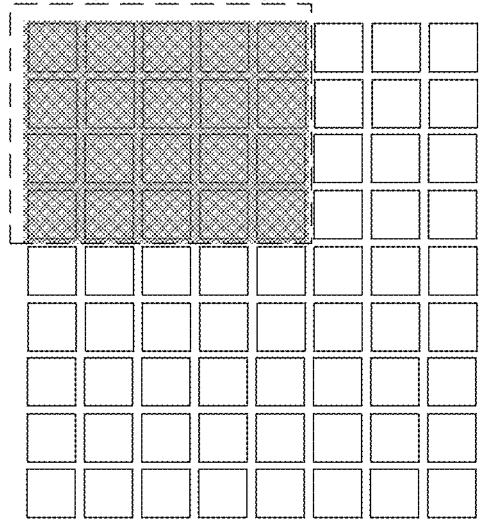
FIG. 4a is a schematic diagram of a matching relationship between rectangular laser speckles and pixel points of an image sensor in one embodiment of the present disclosure.
Figure 4B:
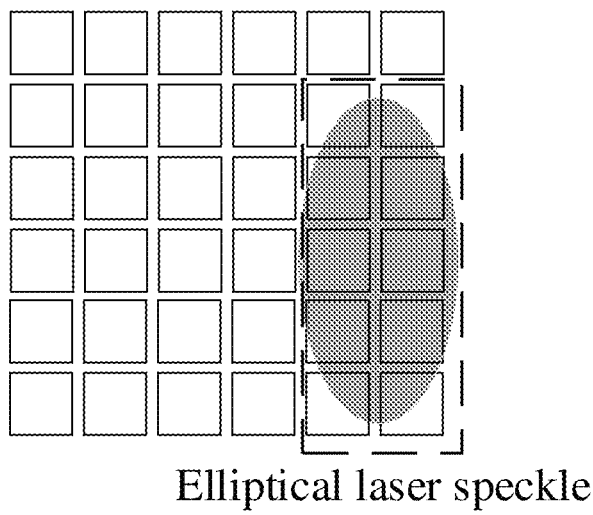
FIG. 4b is a schematic diagram of a matching relationship between elliptical laser speckles and pixel points of an image sensor in one embodiment of the present disclosure.

For this embodiment, the ToF depth sensor based on laser speckle projection is different from an existing ToF transmitting module composed of a laser projector, a diffuser and an image sensor as shown in FIG. 2, an existing ToF distance measuring device generally uses the diffuser to realize floodlighting, and the laser emergent light only needs to match the view field with the image sensor, as shown in FIG. 3; and however, this embodiment uses the DOE to uniformly distribute the modulated incident laser into L beams of emergent light, the sub-beam forms laser speckles after reaching the target and controls the patterns projected out by the laser speckles, and then the depth information is obtained by calculating the phase difference between the incident light and the emergent light according to the pixel position and view field matching of the laser speckles and the image sensor. With the same power consumption, the energy per unit area of light is higher, and the signal-to-noise ratio is increased. The quantity L is determined according to the design of the patterns in the DOE, which is variable and may range from several beams to hundreds of thousands of beams.

In another embodiment, a specific method for obtaining depth information includes: first, obtaining the individual pixel size of an image sensor; next, forming, by each pixel of the image sensor and each beam of emergent infrared laser signals, laser speckles after reaching the detected space for transmitting and receiving view field matching; and then, calculating the phase difference between incident infrared laser signals and emergent infrared laser signals to obtain the depth information.

In this embodiment, obtaining the depth information of the measured object by matching the laser speckles and the pixel points of the image sensor can reduce the power consumption and improve the anti-interference ability during distance measuring.

In another embodiment, the matching principle is to make each pixel point of an image sensor have a laser speckle reflected and then fallen into when measuring the distance within the distance measuring range.

In this embodiment, the receiving view field of the image sensor shall be less than or equal to the transmitting view field of a laser speckle projection unit, at the same time, each pixel of the image sensor may receive the laser speckle signal without losing any pixel, and each pixel will convert the fallen laser signal into an electrical signal with the corresponding phase and frequency.

In another embodiment, incident infrared laser signals project a laser speckle array after being split by a diffraction optical element (DOE).

In another embodiment, a laser speckle array is formed into a regular or irregular pattern, wherein the regular pattern includes a rectangle (as shown by the dotted line part in FIG. 4a), a circle, an ellipse (as shown by the dotted line part in FIG. 4b), or a polygon.

In another embodiment, two adjacent speckles in a laser speckle array are arranged in an evenly spaced mode or randomly.

In another embodiment, the single laser speckle coded pattern in a laser speckle array is circular, rectangular or polygonal, and the single laser speckle may be of different sizes according to the DOE design.

Figure 5:
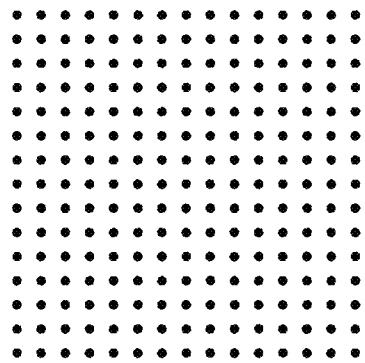
FIG. 5 is a schematic diagram of a rectangular laser speckle array projected by a laser speckle projection unit in one embodiment of the present disclosure.
Figure 6:
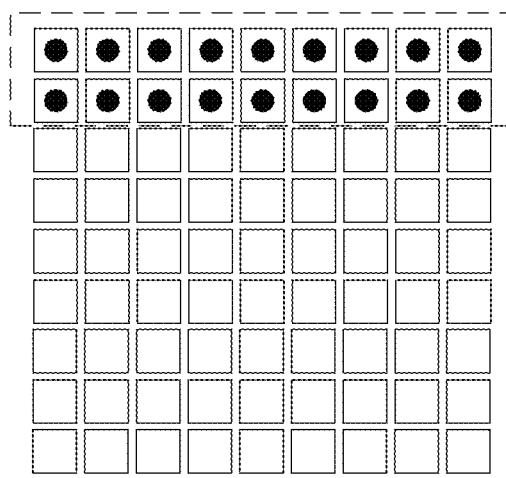
FIG. 6 is a one-to-one regular matching schematic diagram of circular laser speckles and pixel points of an image sensor in one embodiment of the present disclosure.
Figure 7:
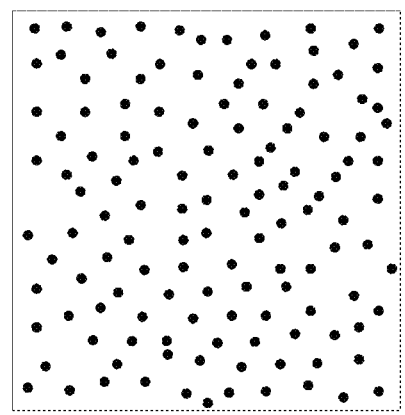
FIG. 7 is a schematic diagram of a random laser speckle array projected by a laser speckle projection unit in one embodiment of the present disclosure.

As shown in FIG. 5, a laser projector with a wavelength of 940 nm and a two-dimensional DOE are selected to realize a laser speckle array, wherein the specification is p×q, and the matching relationship is shown by the dotted line part in FIG. 6. Or as shown in FIG. 7, according to the different designs of the patterns in the DOE, different numbers of p and q are realized, random arrangement of laser speckles is realized, and the matching relationship is shown by the dotted line part in FIG. 8, wherein the order of p and q may be $1\sim10^3$.

For the above embodiments, this band has less energy in the solar spectrum and less interference when used outdoors.

In another embodiment, the phase difference between incident infrared laser signals and emergent infrared laser signals is calculated by a phase method.

In another embodiment, a phase method includes a four-step phase method, a three-step phase method or a five-step phase method, wherein the four-step phase method uses four sampling calculation windows for measuring, the phase delay of each calculation window is 90° (0°, 90°, 180°, 270°), and sampled data are Q1, Q2, Q3 and Q4 respectively.

For this embodiment, the four-step phase method is a commonly used phase unwrapping method at present, and other phase methods may also be applied.

In another embodiment, referring to FIG. 9, a distance measuring method of a ToF depth sensor based on laser speckle projection according to claim 1 is disclosed, which includes the following steps:

S100: a laser projector projects periodic infrared laser signals with phase information to the detected space;

S200: a diffraction optical element (DOE) uniformly distributes the incident infrared laser signals into L beams of emergent infrared laser signals, each of which forms a laser speckle after reaching the detected space and controls the coded pattern projected out by the laser speckle;

S300: first, the individual pixel size of an image sensor is obtained; next, each pixel of the image sensor and each beam of the emergent infrared laser signals form laser speckles after reaching the detected space for transmitting and receiving view field matching; and then, the phase difference between the incident infrared laser signals and the emergent infrared laser signals is calculated to obtain depth information.

For this embodiment, the power consumption is reduced, the anti-interference ability is improved during distance measuring, and thus the distance measuring accuracy and precision are improved.

In another embodiment, a distance measuring method of a ToF depth sensor based on laser speckle projection according to claim 1 is disclosed, which includes:

step S1: a laser projector sends sinusoidal infrared laser signals with a wavelength of 940 nm and a modulation frequency of 60 MHz to the detected space;

step S2: a DOE uniformly distributes the modulated incident infrared laser signals into L beams of emergent infrared laser signals, each beam of which forms a laser speckle after reaching the detected space, the number of the laser speckles is twice the pixel resolution of an image sensor, the projected array of the laser speckles is in rectangular distribution, and at the same time, the receiving view field of the image sensor shall be less than or equal to the transmitting view field of a laser speckle projection unit, that is, the receiving view field may be included in the transmitting view field; and step S3: the image sensor receives the incident light, and data Q1, Q2, Q3 and Q4 are measured by four sampling calculation windows using a four-phase step method, according to the equation (1), the phase difference between the incident light and the emergent light is analyzed and calculated, and depth information is obtained according to the equation (2), $$\Delta\varphi = \arctan[(Q3 - Q1)/(Q0 - Q2)] \quad (1)$$

$$d = \frac{c}{2f_m} \cdot \frac{\Delta\varphi}{2\pi} \quad (2)$$

wherein, d is the depth information of the measured target, c is the speed of light, fm is the laser modulation frequency, and $\Delta\varphi$ is the phase difference between the emergent light and incident light signals.

Although the embodiments of the present disclosure are described above in combination with the drawings, the present disclosure is not limited to the specific embodiments and application fields above, and the specific embodiments above are only schematic, instructive and not restrictive. With the inspiration of the description and without departing from the scope protected by the claims of the present disclosure, those of ordinary skilled in the art can also work out many forms of the embodiments, all of which belong to the protection of the present disclosure.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A ToF depth sensor based on laser speckle projection, comprising a laser speckle projection unit and an image sensor, wherein,
    the laser speckle projection unit is composed of a laser projector and a diffraction optical element (DOE);
    the laser projector is used for projecting periodic infrared laser signals with phase information to a detected space;
    the DOE is used for uniformly distributing a beam of incident infrared laser signals into L beams of emergent infrared laser signals, enabling each beam of emergent infrared laser signals to carry respective phase information, and beam diameters, divergence angles and wavefronts of the emergent infrared laser signals to be identical with those of the incident infrared laser signals, while only changing a transmission direction and controlling coded patterns projected out by laser speckles, wherein L is a positive integer greater than 1; and
    the image sensor is used for obtaining depth information, wherein, the obtaining depth information comprises: first, obtaining an individual pixel size of the image sensor; next, forming, by each pixel of the image sensor and each beam of emergent infrared laser signals, laser speckles after reaching the detected space for transmitting and receiving view field matching; and then, calculating a phase difference between the incident infrared laser signals and the emergent infrared laser signals to obtain the depth information.

2. The ToF depth sensor according to claim 1, wherein the matching principle is to make each pixel point of the image sensor have a laser speckle reflected and then fallen into when measuring a distance within a distance measuring range.

3. The ToF depth sensor according to claim 1, wherein the incident infrared laser signals project a laser speckle array after being split by a DOE.

4. The ToF depth sensor according to claim 3, wherein the laser speckle array is formed into a regular or irregular pattern, wherein the regular pattern comprises a rectangle, a circle, an ellipse, or a polygon.

5. The ToF depth sensor according to claim 3, wherein two adjacent speckles in the laser speckle array are arranged in an evenly spaced mode or randomly.

6. The ToF depth sensor according to claim 3, wherein a single laser speckle coded pattern in the laser speckle array is circular, rectangular or polygonal.

7. The ToF depth sensor according to claim 1, wherein a phase difference between the incident infrared laser signals and the emergent infrared laser signals is calculated by a phase method.

8. The ToF depth sensor according to claim 7, wherein the phase method comprises a four-step phase method, a three-step phase method or a five-step phase method.

9. A distance measuring method adopting a ToF depth sensor based on laser speckle projection, comprising a laser speckle projection unit and an image sensor, wherein the laser speckle projection unit is composed of a laser projector and a diffraction optical element (DOE); the laser projector is used for projecting periodic infrared laser signals with phase information to a detected space; the DOE is used for uniformly distributing a beam of incident infrared laser signals into L beams of emergent infrared laser signals, enabling each beam of emergent infrared laser signals to carry respective phase information, and beam diameters, divergence angles and wavefronts of the emergent infrared laser signals to be identical with those of the incident infrared laser signals, while only changing a transmission direction and controlling coded patterns projected out by laser speckles, wherein L is a positive integer greater than 1; and the image sensor is used for obtaining depth information, comprising the following steps:

S100: projecting, by a laser projector, periodic infrared laser signals with phase information to a detected space;

S200: uniformly distributing, by a DOE, incident infrared laser signals into L beams of emergent infrared laser signals, each beam of the emergent infrared laser signals forming a laser speckle after reaching the detected space and controlling a coded pattern projected out by the laser speckle;

S300: first, obtaining an individual pixel size of the image sensor; next, forming, by each pixel of the image sensor and each beam of emergent infrared laser signals, laser speckles after reaching the detected space for transmitting and receiving view field matching; and then, calculating a phase difference between the incident infrared laser signals and the emergent infrared laser signals to obtain depth information.

* * * * *